No. 878,652. PATENTED FEB. 11, 1908.
A. T. MATTHEWS.
BALL BEARING.
APPLICATION FILED JUNE 12, 1903.

Witnesses:
Inventor:
A. T. Matthews.
By his Attorneys,
Southgate & Southgate

UNITED STATES PATENT OFFICE.

AMBROSE T. MATTHEWS, OF WORCESTER, MASSACHUSETTS.

BALL-BEARING.

No. 878,652.

Specification of Letters Patent.

Patented Feb. 11, 1908.

Application filed June 12, 1903. Serial No. 161,153.

*To all whom it may concern:*

Be it known that I, AMBROSE T. MATTHEWS, a citizen of the United States, residing at Worcester, in the county of Worcester and State of Massachusetts, have invented a new and useful Ball-Bearing, of which the following is a specification.

This invention relates to that class of ball-bearings which are intended to be manufactured and sold as articles of manufacture, ready for use in machinery or in other situations where the same are to be applied.

The especial object of this invention is to provide a ball bearing cone with a washer or ring for holding the parts of the bearing together.

To this end, this invention consists of the ball-bearing as an article of manufacture, and of the combinations of parts therein as hereinafter described and more particularly pointed out in the claims at the end of this specification.

Figure 1:
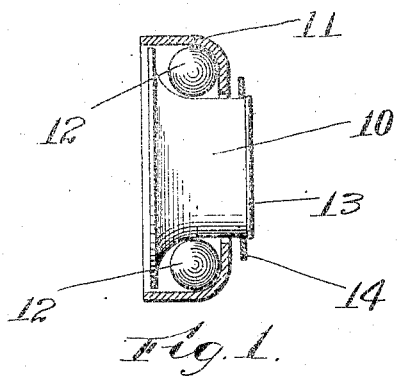
Figures 2, 3:
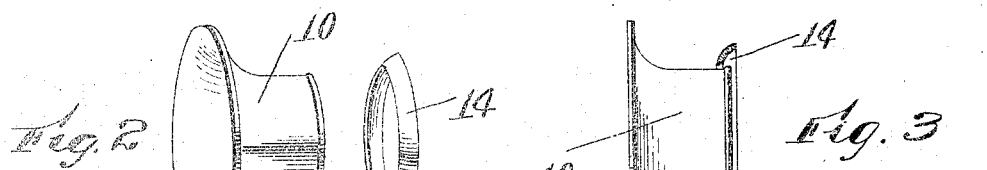
Figure 4:
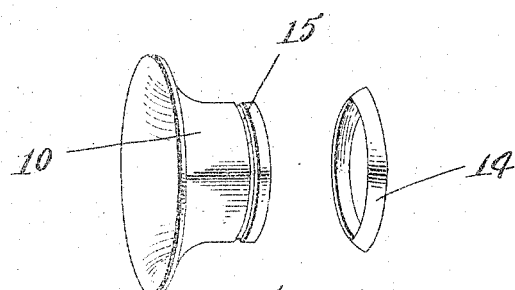
Figure 5:
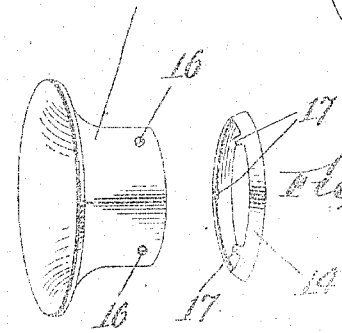
Figure 6:
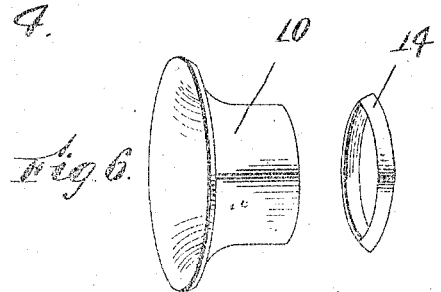

In the accompanying drawing, Figure 1 is a side view partially in section of a ball-bearing constructed according to this invention. Fig. 2 is a perspective view of the ball-bearing cone and its holding washer in its original form. Fig. 3 is a side view partially in section showing the manner in which the ball cone and its washer are put together. Figs. 4, 5 and 6 are perspective views illustrating slightly modified forms of construction.

In the use of ball-bearings, and especially in making that class of ball-bearings which are intended to be placed upon the market as distinct articles of manufacture, it has heretofore been customary to employ ball-cages or ball-retaining devices of various kinds for preventing the balls from dropping out of position. These ball-cages or ball-retainers have heretofore usually been sprung into place to engage the bearing-balls themselves.

The use of these ball-retainers I have found to be objectionable because when not properly adjusted they are liable to be engaged by the bearing balls so as to increase the friction thereof, or in other cases, these ball-retainers or ball-cages are liable to become loosened.

To overcome these objections in a ball bearing constructed according to my invention I have provided the ball-bearing cone with a retaining washer or ring. This retaining washer or ring engages the rear side of the ball casing and will efficiently hold the parts together; while at the same time, it will not interfere or in any way be liable to come into contact with the bearing balls running in the ball-casing or track.

Referring to the accompanying drawing and in detail, as shown in Fig. 1, the ball-bearing constructed according to this invention comprises the ball-bearing cone 10 which is adapted to be secured to the stud or shaft; the ball-casing or track 11 which is to be secured to the box of the stud or shaft; and the series of balls 12 which are held in place between the ball-cone 10 and the ball-casing or track 11. The body portion of the ball-bearing cone 10 extends through the central opening in the ball-casing or track 11.

In assembling a ball-bearing of this kind, the bearing balls are dropped into place, and when the ball-bearing cone occupies its normal position the balls will be held in place. These parts of the ball-bearing are of substantially the ordinary construction, and are preferably made from hardened steel. When the ball-bearing cone has been put in place, the extreme hardness thereof prevents the same from being pinned, headed over, or otherwise locked in place by any means which would require the cutting or changing of the shape thereof, and in order to avoid this objection, and at the same time provide for fastening the parts together in a simple and efficient manner, I employ a holding washer or ring. This holding washer or ring may be of different constructions, but in practice, it is preferably made of tapering or conical shape having a central opening which is large enough to receive the body portion of the ball-bearing cone 10, the conical shape of the fastening washer or ring causing the same to be contracted firmly on to the body portion of the cone when the ring is flattened or pressed to final position. Different means may be provided for preventing the fastening washer from slipping. For example, as illustrated in Fig. 1, the ball-bearing cone 10 is provided with a slight turned over holding-bead or flange 13.

The fastening washer 14, as shown in Fig. 2, is of a tapering or conical form, and has its central opening of sufficient diameter to permit the same to be slid on to the end of the body portion of the ball-bearing cone, as shown in Fig. 3. These parts are so proportioned that when the fastening washer or ring 14 is flattened or pressed to final position, as illustrated in Fig. 2, it will be contracted firmly into engagement with the ball-bearing cone 10, while the end flange or bead 13 will prevent any possibility of the holding ring slipping out of place. In some cases, instead of providing the ball-bearing cone 10 with a holding flange or bead 13, it may be provided with a slight depression or groove 15, as illustrated in Fig. 4.

In the modification illustrated in Fig. 5, the ball-bearing cone 10 is provided with small holes or sockets 16 for receiving integral keys or pins 17 which extend in from the body portion of the holding washer 14. In other cases, especially in smaller sizes of bearings, I have found that no special means need be employed for preventing the fastening washer slipping off the end of the ball-bearing cone. That is to say, as illustrated in Fig. 6, the body portion of the ball-bearing cone 10 may be of straight cylindrical form, and the fastening washer 14 when applied thereto will be gripped or pressed thereon with sufficient firmness so that friction alone will prevent the same from slipping off of its applied position. By means of these constructions, the fastening washer or ring becomes a fixture securely applied to the ball-bearing cone 10, and as these fastening washers or rings are locked in place without requiring the cutting or changing of the shape of the ball-bearing cone, I have provided a form of ball-bearing in which the parts are fastened together so that the bearings may be sold as complete articles of manufacture; while at the same time, the fastening means are on the back side of the bearing where they cannot interfere with the bearing balls.

I am aware that changes may be made in practicing my invention by those who are skilled in the art without departing from the scope thereof as expressed in the claims.

I do not wish, therefore, to be limited to the constructions I have herein shown and described, but What I do claim and desire to secure by Letters Patent of the United States is:—

1. As an article of manufacture, a bearing comprising a track, a cone having its small end projecting through to the rear of the track, a set of rolling bearing elements held between the adjacent bearing surfaces of the track and cone, a washer contracted on the projecting small end of the cone whereby it has equally applied compressional engagement entirely around the periphery of the end for holding it in position, said washer permanently serving to prevent the separation of the track and cone.

2. As an article of manufacture, a ball-bearing comprising a ball-track, a tubular ball-cone having a retaining bead at the end of its body portion which projects through to the rear of the ball-track, and a fastening washer encircling the body portion of the ball-track and having a central circular opening with compressional engagement applied equally around the entire periphery of the ball-cone and located in position to be held in place by the bead.

3. As an article of manufacture, a ball-bearing, comprising a ball track, a ball cone projecting through to the back-side of the ball track, a set of bearing balls, and a fastening washer behind the end of the ball track and encircling the ball cone, said washer being held on the cone partly by frictional engagement with the smooth surface thereof, and the cone being provided with means for preventing the removal of the washer therefrom.

4. As an article of manufacture, a bearing, comprising a track, a cone projecting through to the backside of the track, a set of bearing elements held between the track and cone, and a washer contracted on the projecting end of the cone whereby it has compressional engagement around the periphery of the cone for holding it in position, and means on said cone for permanently preventing the removal of the washer therefrom.

In testimony whereof I have hereunto set my hand, in the presence of two subscribing witnesses.

AMBROSE T. MATTHEWS.

Witnesses:
J. ELMER HALL,
PHILIP W. SOUTHGATE.